US010462312B2

(12) United States Patent
Kaneko

(10) Patent No.: US 10,462,312 B2
(45) Date of Patent: *Oct. 29, 2019

(54) INFORMATION PROCESSING APPARATUS FOR SETTING IMAGE-QUALITY ADJUSTMENT INFORMATION AND IMAGE FORMING APPARATUS MANAGEMENT SYSTEM INCLUDING THE SAME

(71) Applicant: Sharp Kabushiki Kaisha, Sakai, Osaka (JP)

(72) Inventor: Shota Kaneko, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,064

(22) Filed: Jun. 20, 2018

(65) Prior Publication Data

US 2018/0302519 A1    Oct. 18, 2018

Related U.S. Application Data

(63) Continuation of application No. 15/614,643, filed on Jun. 6, 2017, now Pat. No. 10,033,887.

(30) Foreign Application Priority Data

Jun. 13, 2016    (JP) ................................. 2016-116761

(51) Int. Cl.
  *G06F 3/12*    (2006.01)
  *H04N 1/00*    (2006.01)
(52) U.S. Cl.
  CPC ....... *H04N 1/00244* (2013.01); *G06F 3/1203* (2013.01); *G06F 3/1204* (2013.01);
  (Continued)

(58) Field of Classification Search
  CPC .......... H04N 1/00244; H04N 1/00278; H04N 1/00344; H04N 1/00411; H04N 1/00416;
  (Continued)

(56) References Cited

U.S. PATENT DOCUMENTS

2010/0202786 A1* 8/2010 Ikeno ................. G03G 15/5012
                                                                  399/11
2011/0310409 A1* 12/2011 Yukumoto ......... H04N 1/00244
                                                                  358/1.9

(Continued)

OTHER PUBLICATIONS

Kaneko, "Information Processing Apparatus for Setting Image-Quality Adjustment Information and Image Forming Apparatus Management System Including the Same", U.S. Appl. No. 15/614,643, filed Jun. 6, 2017.

*Primary Examiner* — Gabriel I Garcia
(74) *Attorney, Agent, or Firm* — Keating & Bennett, LLP

(57) ABSTRACT

An information processing apparatus is connected to an image forming apparatus in such a manner that communication is possible, the image forming apparatus forming an image in accordance with image-quality adjustment information that is set therein. The information processing apparatus includes a controller and a storage, the controller obtains, through the network, first information set in a first image forming apparatus, and second information set in a second image forming apparatus. The controller stores the first and second information in the storage, reads the first and second information from the storage, creates third information based on the first and second information, and transmits the third information, through the network, to the second image forming apparatus.

7 Claims, 7 Drawing Sheets

(52) U.S. Cl.
CPC .......... *G06F 3/1254* (2013.01); *G06F 3/1257* (2013.01); *G06F 3/1268* (2013.01); *G06F 3/1285* (2013.01); *G06F 3/1286* (2013.01); *H04N 1/00278* (2013.01); *H04N 1/00344* (2013.01); *H04N 1/00411* (2013.01)

(58) Field of Classification Search
CPC .......... H04N 1/00973; H04N 1/32122; H04N 1/32502; H04N 2201/3276; H04N 2201/3204; H04N 2201/0039; H04N 2201/0094; H04N 2201/3278; H04N 2201/3205; G06F 3/1203; G06F 1/1204; G06F 1/1231; G06F 1/1254; G06F 1/1257; G06F 1/1268; G06F 1/1285; G06F 1/1286; G06F 1/1288; G06K 15/1805
USPC ................................ 358/1.1–1.18, 474, 402
See application file for complete search history.

(56) References Cited

U.S. PATENT DOCUMENTS

| | | | | |
|---|---|---|---|---|
| 2012/0307287 | A1* | 12/2012 | Motosugi | G06K 15/00 358/1.14 |
| 2013/0163041 | A1* | 6/2013 | Sato | G06K 15/1805 358/1.15 |
| 2017/0070625 | A1* | 3/2017 | Yee | H04N 1/00517 |
| 2017/0277484 | A1* | 9/2017 | Takagi | G06F 3/1231 |

* cited by examiner

INFORMATION PROCESSING APPARATUS FOR SETTING IMAGE-QUALITY ADJUSTMENT INFORMATION AND IMAGE FORMING APPARATUS MANAGEMENT SYSTEM INCLUDING THE SAME

BACKGROUND

1. Field

The present disclosure relates to a technique for efficiently setting image-quality adjustment information in an image forming apparatus.

2. Description of the Related Art

Image forming apparatuses have been made more convenient than before by including a higher variety functions. However, when replacing an image forming apparatus, there is often a demand to use a new image forming apparatus in the same status as the image forming apparatus to be replaced. In such a case, now that the number of functions has increased, various settings need to be set. Accordingly, a technique is proposed for causing a computer to efficiently set configuration information at the time of replacement by making a simple association, such as whether or not duplex printing is possible (Japanese Unexamined Patent Application Publication No. 2013-125520). Similarly, Japanese Unexamined Patent Application Publication No. 2007-19809, Japanese Unexamined Patent Application Publication No. 2013-131168, and Japanese Unexamined Patent Application Publication No. 2013-122689 disclose techniques for allowing the new image forming apparatus to take over the configuration information of the image forming apparatus to be replaced.

In an image forming apparatus, in addition to the configuration information, user-environment information regarding image-quality adjustment such as coloring by printing is prepared as an adjustment item, and such information is often used with adjustment content desired by each user. The techniques disclosed in Japanese Unexamined Patent Application Publication No. 2013-125520, Japanese Unexamined Patent Application Publication No. 2007-19809, Japanese Unexamined Patent Application Publication No. 2013-131168, and Japanese Unexamined Patent Application Publication No. 2013-122689 are processing for taking over the configuration information by making a simple association and do not include processing for taking over the user-environment information at the time of replacement. The user-environment information includes setting information related to image-quality adjustment and status information of an apparatus. At the time of replacement, these various kinds of information need to be considered, and a simple association is insufficient to perform processing.

SUMMARY

The present disclosure has been made in view of the above situation, and it is desirable to provide an information processing apparatus and an image forming apparatus management system that can efficiently set image-quality adjustment information in an image forming apparatus that is an adjustment target by using user-environment information of another image forming apparatus.

According to an aspect of the disclosure, there is provided an information processing apparatus to be connected to an image forming apparatus in such a manner that communication is possible, the image forming apparatus forming an image in accordance with image-quality adjustment information that is set therein, the information processing apparatus including an information creating unit that creates, from the image-quality adjustment information including setting information and status information, the image-quality adjustment information having been set in a first image forming apparatus, and from status information in image-quality adjustment information that has been set in a second image forming apparatus that is an adjustment target, setting information to be included in the image-quality adjustment information of the second image forming apparatus; and an information setting unit that sets, in the second image forming apparatus, the created setting information to be included in the image-quality adjustment information of the second image forming apparatus.

According to another aspect of the disclosure, there is provided an image forming apparatus management system including the information processing apparatus; the first image forming apparatus connected to the information processing apparatus; and the second image forming apparatus connected to the information processing apparatus.

Note that the information processing apparatus may be a server, a portable memory chip, or the like.

DESCRIPTION OF THE EMBODIMENTS

Figure 1:
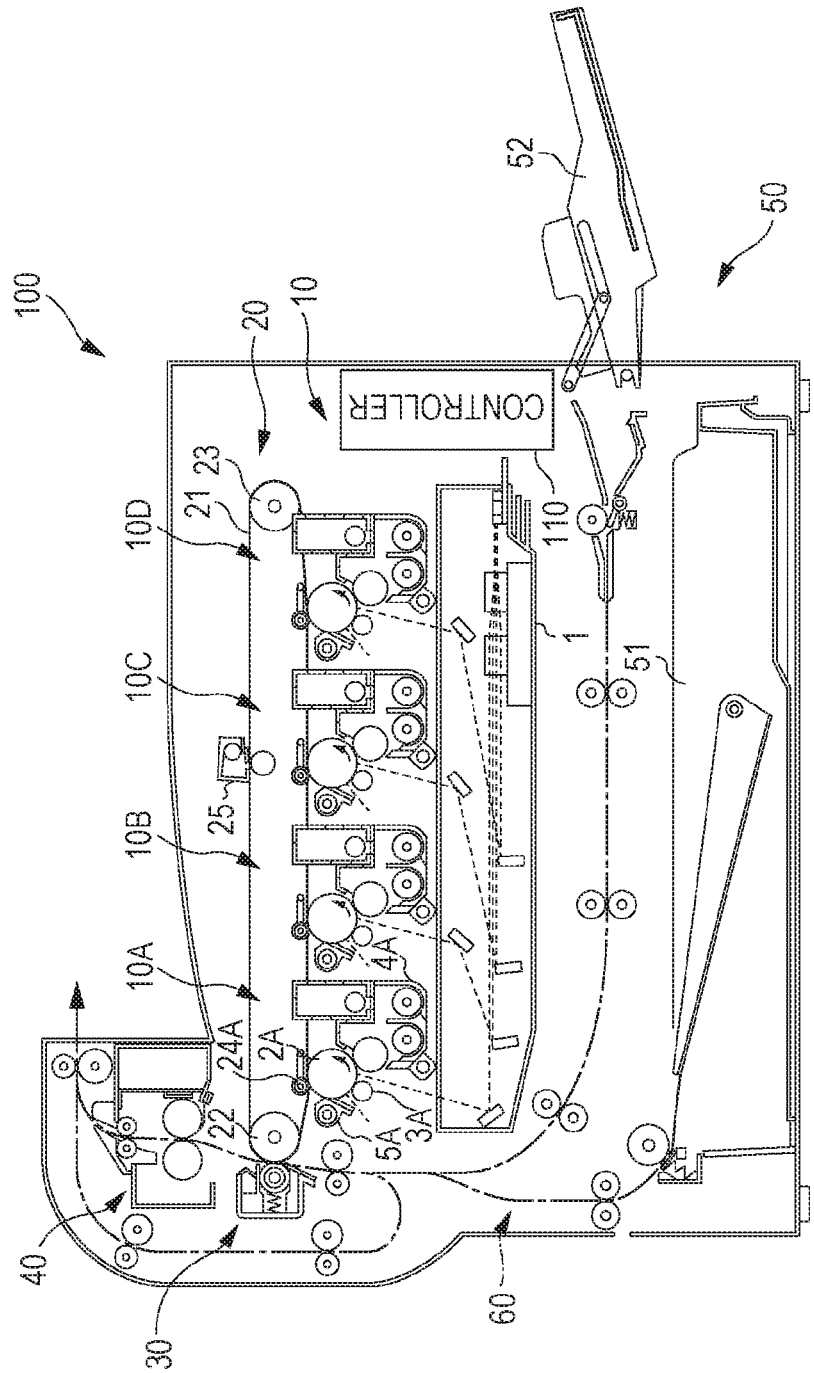
FIG. 1 is a front view of the entire configuration of an image forming apparatus to which the present disclosure applies.

As illustrated in FIG. 1, an image forming apparatus 100 includes an image forming unit 10, an intermediate transfer unit 20, a secondary transfer unit 30, a fixing unit 40, a sheet feeding unit 50, and a sheet transporting unit 60. Note that a reading unit that optically reads document images and an automatic document transporting device may be installed as needed. The image forming apparatus 100 performs processing in which color or monochrome image data that has been input from an external apparatus that is not illustrated or image data of a document that has been read by the reading unit is formed as an image on a sheet of paper in color or monochrome.

The image forming unit 10 employs a tandem electrophotographic method in this embodiment and includes a light-beam scanning unit 1 and image forming units 10A to 10D of respective colors having substantially the same configuration. The light-beam scanning unit 1 includes a semiconductor laser that emits laser beams of a set light amount. The light-beam scanning unit 1 converts the red (R), green (G), and blue (B) image data of each pixel, which has been input and corresponds to a color document, into cyan (C), magenta (M), yellow (Y), and black (K) density data, exposes and scans, in an axial direction (main scanning direction), surfaces of photosensitive drums 2A of the image forming units 10A to 10D with light of a laser beam that has been modulated with a duty ratio corresponding to each density data item obtained by the conversion, and forms respective electrostatic latent images. The image forming unit 10A will be described as a representative image forming unit. The image forming unit 10A develops images in black (K) and includes the photosensitive drum 2A as an image carrier and also includes a charging device 3A, a developing device 4A, and a cleaning unit 5A in the rotational direction (sub-scanning direction) around the photosensitive drum 2A. The developing device 4A supplies toner to the photosensitive drum 2A to provide a visualization of an electrostatic latent image as a toner image. After the toner image has been transferred onto a recording sheet, the cleaning unit 5A cleans the photosensitive drum 2A by, for example, scraping out remaining toner thereon.

The intermediate transfer unit 20 includes an intermediate transfer belt 21, a driving roller 22, a driven roller 23, and primary transfer rollers 24A and performs primary transfer of the toner image (developer image) formed on a circumferential surface of each of the photosensitive drums 2A onto a surface of the intermediate transfer belt 21 as an image carrier. The secondary transfer unit 30 performs secondary transfer of the toner image on the surface of the intermediate transfer belt 21 onto a sheet of paper. The intermediate transfer unit 20 further includes a cleaning unit 25. The cleaning unit 25 is disposed to face the intermediate transfer belt 21 at an appropriate position on the running path of the intermediate transfer belt 21 to collect remaining toner on the intermediate transfer belt 21 after fixing. The fixing unit 40 heats and fixes the toner image transferred onto the sheet of paper and discharges the sheet of paper to a paper output tray. The sheet feeding unit 50 includes a sheet feeding cassette 51 and a manual-feed tray 52 and feeds a selected sheet of paper to the sheet transporting unit 60.

Figure 3:
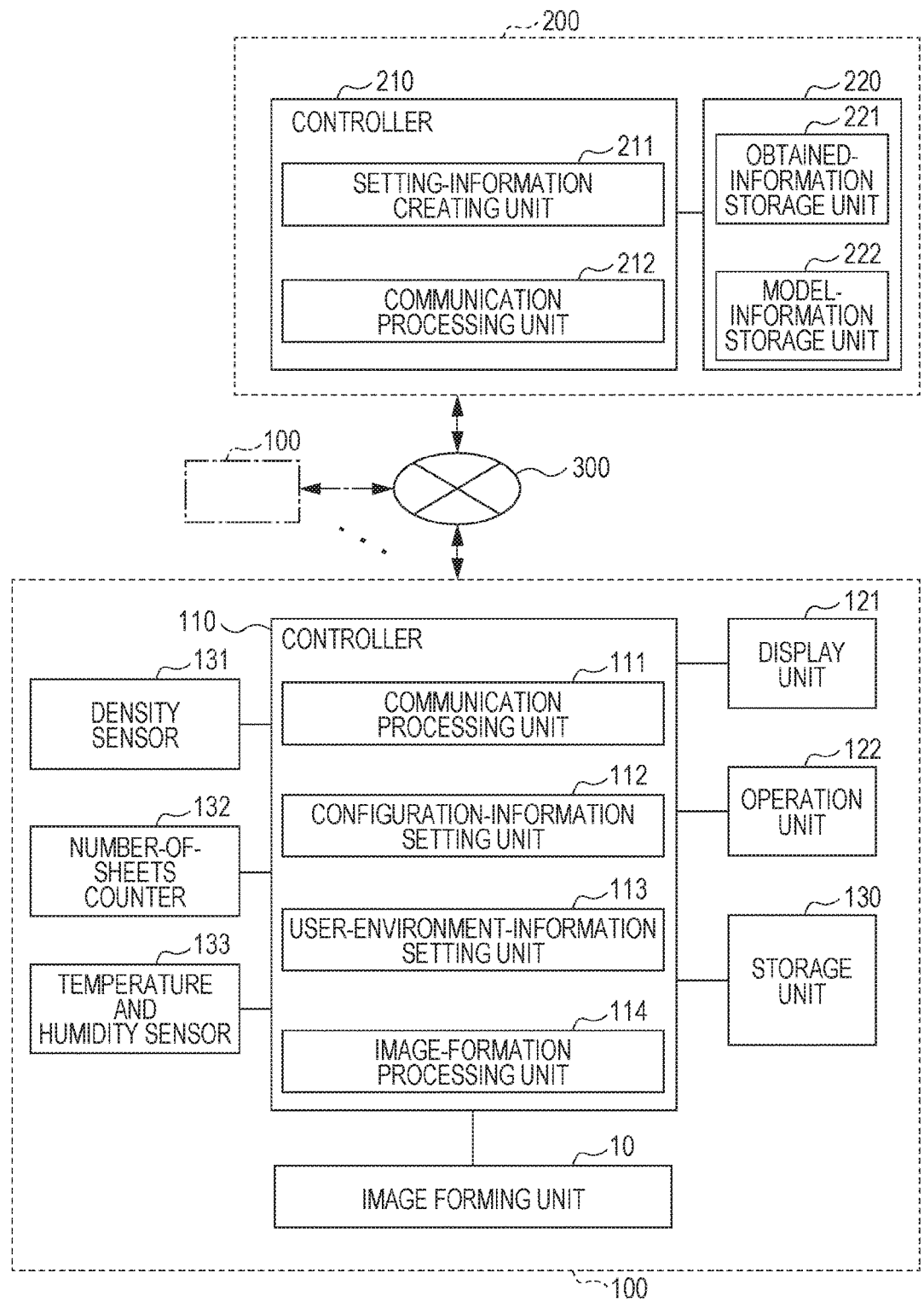
FIG. 3 is a block diagram illustrating an example of a functional configuration of the server and the image forming apparatus.

The image forming unit 10 is operated by an image-formation processing unit 114 (see FIG. 3) on the basis of setting contents corresponding to various functions stored in a storage unit 130 (see FIG. 3). Various functions include, for example, configuration information such as duplex/simplex printing and landscape/portrait printing. In addition to the configuration information, various functions include setting information and status information as user-environment information for image-quality adjustment corresponding to individual user's preference. Examples of the setting information include process control targets (e.g., developing bias) for adjusting laser power for changing the thickness of characters or line drawings, image density, and grayscale. As the status information, the following various correction information items are assumed: calibration, temperature and humidity that affect toner characteristics, and halftone information for grayscale adjustment for realizing coloring unique to a user. Then, the image-formation processing unit 114 (see FIG. 3) performs known processing, such as filtering, on an image to be printed and further causes the image forming unit 10 to perform processing in accordance with the configuration information and the user-environment information.

Figure 2A:
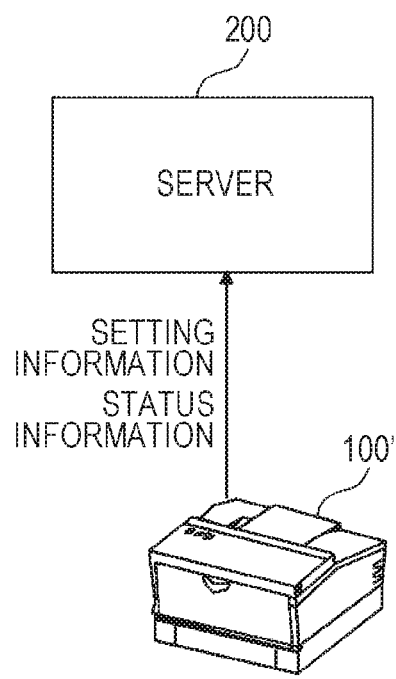
FIG. 2A illustrates flow of information between an image forming apparatus to be replaced and a server.
Figure 2B:
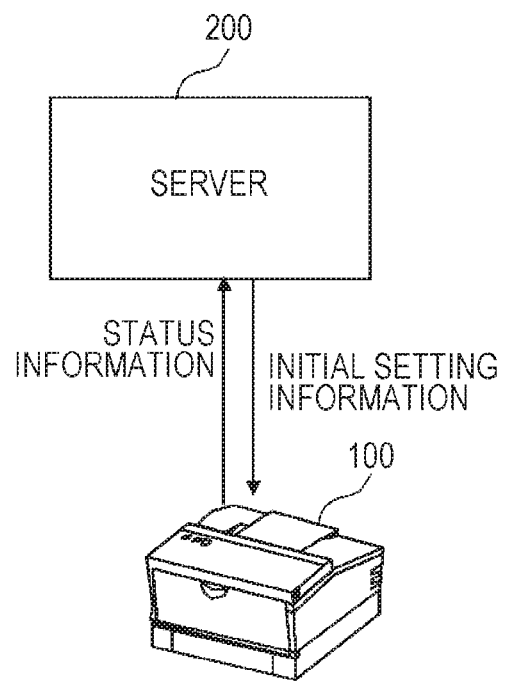
FIG. 2B illustrates flow of information between the image forming apparatus after replacement and the server.

FIGS. 2A and 2B illustrate a system in which the image forming apparatus 100 and a server 200 as an information processing apparatus are connected so as to be able to communicate user-environment information for image-quality adjustment with wires or wirelessly. The communication medium may be a network 300 (see FIG. 3) such as the Internet or a local area network (LAN). Note that the transmission and reception of the configuration information is omitted from illustration in FIGS. 2A and 2B.

In FIGS. 2A and 2B, from an image forming apparatus to be replaced (hereinafter referred to as a machine to be replaced) 100' that is connected to a certain line, the setting information and the status information as the user-environment information are transmitted to (saved in) the server 200. Then, the machine to be replaced 100' is removed, and a new image forming apparatus (hereinafter referred to as an adjustment-target machine as appropriate) 100 may be installed (the machine to be replaced 100' may be exchanged for the adjustment-target machine 100) onto the corresponding line as illustrated in FIG. 2B. Upon the exchange, the adjustment-target machine 100 is started, and the status information is acquired and transmitted to the server 200.

From the setting information and the status information transmitted from the machine to be replaced 100' and the status information transmitted from the adjustment-target machine 100, the server 200 creates setting information to be set in the adjustment-target machine 100 so as to set the same user environment of the adjustment-target machine 100 as that of the machine to be replaced 100', and transmits the setting information to the adjustment-target machine 100 as initial setting information. On the basis of the initial setting information, the adjustment-target machine 100 takes over the user environment of the machine to be replaced 100' without any change. Note that by using machine IDs and the like, the machine to be replaced 100' and the adjustment-target machine 100 can be identified as targets of exchange. If the model of the machine to be replaced 100' differs from the model of the adjustment-target machine 100, by performing, for example, conversion processing between the models by using characteristics information that has been stored in advance according to model, the setting information can be created so as to set the same environment.

Referring to FIG. 3, first, a functional configuration of the image forming apparatus 100 will be described. The image forming apparatus 100 includes a controller 110 that includes a computer and the like and that controls operations of the image forming unit 10. The controller 110 is connected to a display unit 121 that is formed of a liquid crystal display panel or the like and that displays images, an operation unit 122 that includes a touch panel, a button key, and the like and that receives an input operation from a user, and the storage unit 130. The storage unit 130 stores a control program for operating the image forming unit 10, a control program for setting information in an adjustment mode and for performing communication with the server 200, and various kinds of information regarding setting (default information, configuration information, and user-environment information (setting information and status information)). The storage unit 130 also includes a work area for temporarily storing an image to be printed and the like.

The controller 110 is connected to a density sensor 131, a number-of-sheets counter 132, and a temperature and humidity sensor 133. The density sensor 131 includes a light emitting element and a light receiving element, which face each other at an appropriate position on the running path of the intermediate transfer belt 21, and optically measures the density of a patch during process control. The number-of-sheets counter 132 counts the sum of printed sheets of paper. The temperature and humidity sensor 133 is disposed at an appropriate position in an apparatus housing and measures the temperature and humidity therein.

Upon execution of a control program in an adjustment mode, the controller 110 functions as a communication processing unit 111, a configuration-information setting unit 112, a user-environment information setting unit 113, and the image-formation processing unit 114 that controls operations of the image forming unit 10.

The communication processing unit 111 performs communication of information such as the configuration information, the user-environment information, and a machine ID with the server 200 through the network 300.

The configuration-information setting unit 112 and the user-environment-information setting unit 113 are included in both the machine to be replaced 100' and the adjustment-target machine 100 after replacement. That is, before exchange, the configuration-information setting unit 112 of the machine to be replaced 100' performs processing for acquiring the configuration information and transmitting the configuration information to the server 200 to be saved therein. In addition, after replacement, upon starting of the adjustment-target machine 100, the configuration-information setting unit 112 of the adjustment-target machine 100 performs processing for obtaining the configuration information of the machine to be replaced 100' that has been saved in the server 200 and registering (setting) the configuration information in the storage unit 130.

Before exchange, the user-environment-information setting unit 113 of the machine to be replaced 100' performs processing for acquiring the user-environment information (setting information and status information) and transmitting the user-environment information to the server 200 to be saved therein. In addition, after replacement, upon starting of the adjustment-target machine 100, the user-environment-information setting unit 113 of the adjustment-target machine 100 performs processing for acquiring the status information in the user-environment information and transmitting the status information to the server 200. Furthermore, the user-environment-information setting unit 113 then performs processing for obtaining the setting information in the user-environment information, which has been created by the server 200, from the server 200 and registering (setting) the setting information in the storage unit 130.

The server 200 includes a controller 210 formed of a computer and a storage unit 220. The storage unit 220 includes a memory area for storing processing programs and a work area for executing processing, and in addition, includes an obtained-information storage unit 221 that obtains various kinds of information transmitted from the image forming apparatus 100 and a model-information storage unit 222 that stores characteristics information according to the model of each image forming apparatus 100 connected through the network 300.

By executing processing programs, the controller 210 functions as a setting-information creating unit 211 and a communication processing unit 212 that transmits and receives various kinds of information to and from the image forming apparatus 100 through the network 300.

On the basis of information of the obtained-information storage unit 221, the setting-information creating unit 211 creates the setting information of the adjustment-target machine 100 after replacement. If the model of the image forming apparatus differs before and after replacement, on the basis of information of the obtained-information storage unit 221 and the model-information storage unit 222, the setting-information creating unit 211 creates the setting information of the adjustment-target machine 100 after replacement.

Next, referring to FIGS. 4 and 5, a first embodiment for creating the setting information of the adjustment-target machine 100 after replacement on the basis of the information of the obtained-information storage unit 221 will be described.

Figure 4:
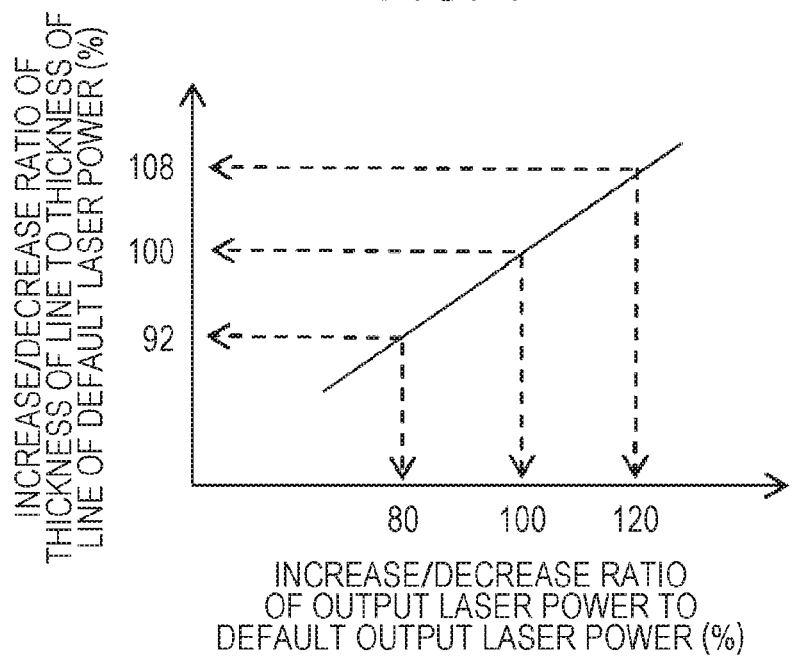
FIG. 4 illustrates the relationship between laser power and the thickness of a printed line.

FIG. 4 illustrates a case in which the same line thickness is to be set in the adjustment-target machine 100. As illustrated in FIG. 4, the line thickness of characters corresponds to laser power output. Now, if the laser power according to the setting information of the machine to be replaced 100' is set at 80% and the same line thickness is to be set in the machine after replacement, another condition, that is, the status information of the machine to be replaced 100', is compared with the status information of the adjustment-target machine 100. If the status information of the machine to be replaced 100' is identical to the status information of the adjustment-target machine 100, the setting information indicating a laser power of 80% is created. On the other hand, if information affecting the line thickness is different in the status information of the machine to be replaced 100' and the status information of the adjustment-target machine 100, in accordance with correction conditions that are prepared in advance, the laser power may be set by being corrected so as to correspond to the difference. In addition, if the models are different, the laser power may be set by performing conversion on the basis of the relationship between the laser power of both models and the line thickness.

Figure 5:
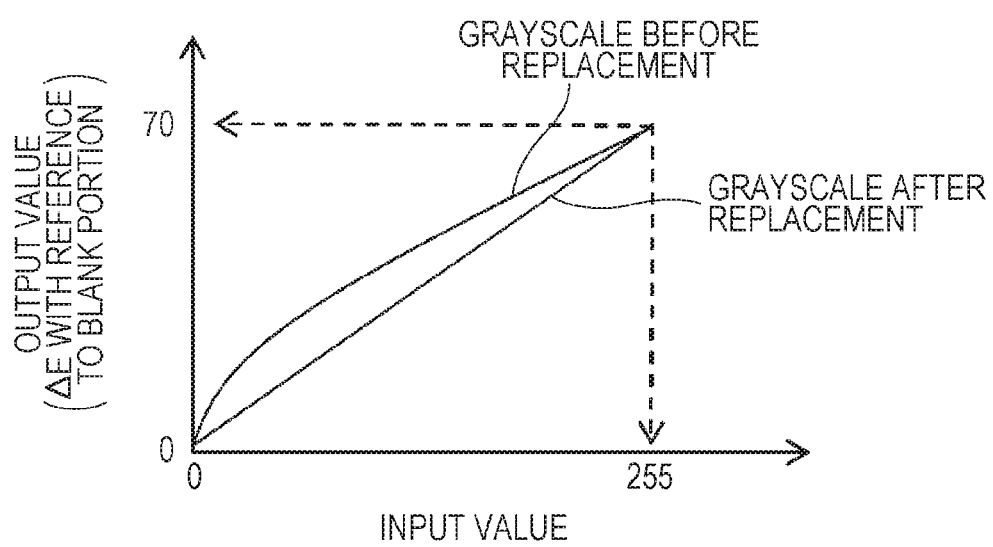
FIG. 5 illustrates grayscales of an image forming apparatus to be replaced and the image forming apparatus that is an adjustment target.

Next, FIG. 5 illustrates a case in which the same coloring is to be set in the adjustment-target machine 100. As the coloring, the grayscales of produced colors are changed by changing the grayscale (γ characteristic) of each color. As illustrated in FIG. 5, by setting the γ characteristic of the adjustment-target machine 100 after replacement to be substantially the same as the γ characteristic before replacement, the same coloring can be produced. Accordingly, the γ characteristic of each color is created from a process control target of the machine to be replaced 100' and from color measurement data obtained through calibration. Then, the created γ characteristic of each color is transmitted to the adjustment-target machine 100 after replacement, and in a table of the γ characteristic of each color, an initial setting, for example, is overwritten with the transmitted γ characteristic of each color. As another method, the difference (in output value direction) between the γ characteristic of each color of the machine to be replaced 100' and the γ characteristic of each color that has been set as an initial setting in the adjustment-target machine 100 after replacement may be created as the setting information, and information related to this difference may be transmitted to the adjustment-target machine 100 as the setting information.

Figure 6:
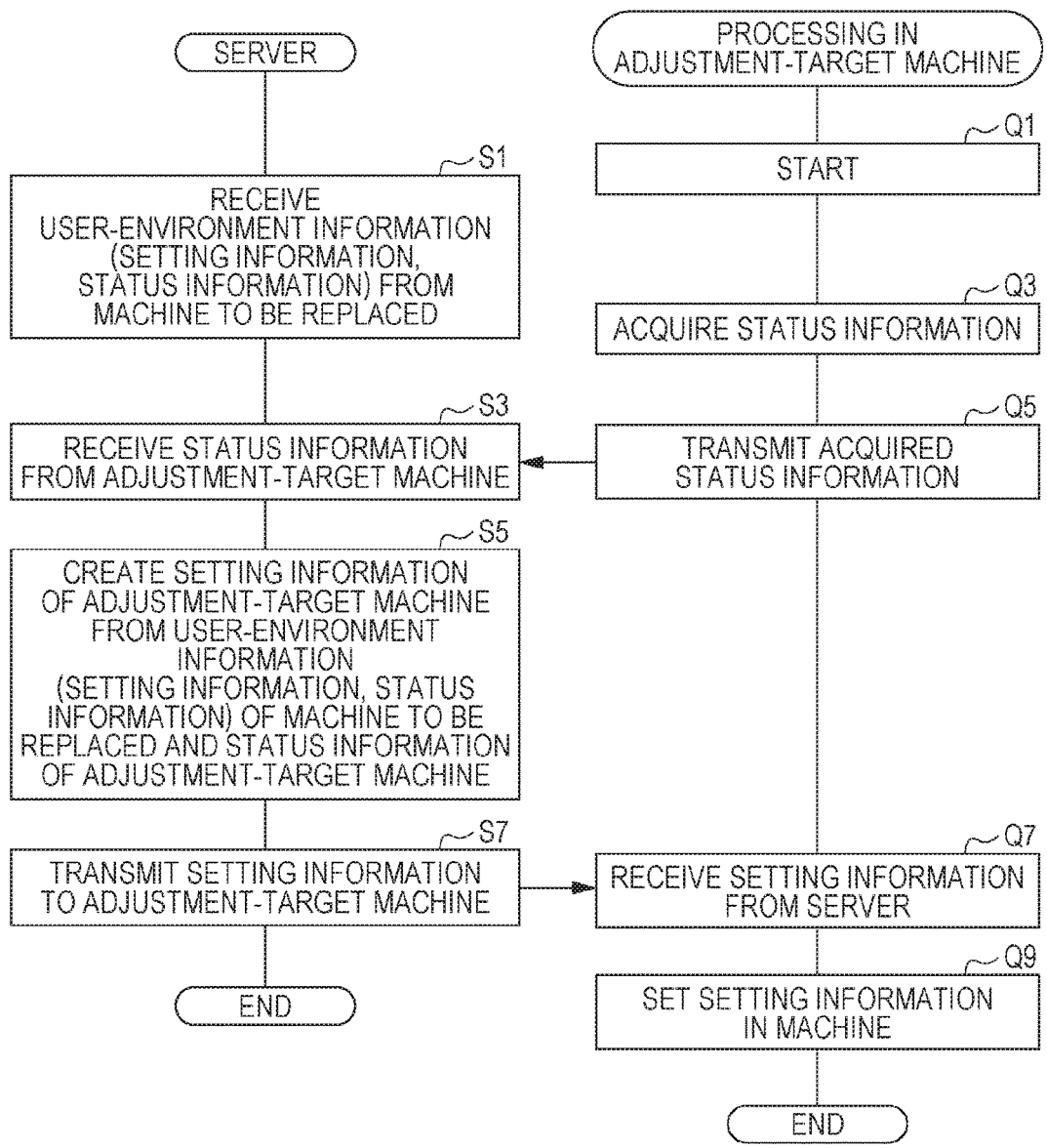
FIG. 6 is a flowchart illustrating processing according to a first embodiment for adjusting the image forming apparatus that is an adjustment target, the processing performed between the server and the image forming apparatus that is an adjustment target.

Next, setting of information in an adjustment-target machine after replacement will be described with reference to FIG. 6. Note that the transmission and reception of the configuration information will be omitted from description.

First, the server 200 receives and obtains ID information and the user-environment information (setting information and status information) from the machine to be replaced 100' in an adjustment mode that is executed upon reception of an instruction for the operation unit 122 (step S1). Then, the machine to be replaced 100' is removed, and then the adjustment-target machine 100 after replacement is installed onto the corresponding line. Then, the adjustment-target machine 100 is started (step Q1). After the start, automatically or upon reception of an instruction for an adjustment mode, the adjustment-target machine 100 acquires the status information in the user-environment information (step Q3) and transmits the acquired status information to the server 200 together with the ID information (step Q5).

Upon reception of the information (step S3), the server 200 recognizes this as a replacement adjustment request from the adjustment-target machine 100 and executes the following process (step S5). That is, from the user-environment information (setting information and status information) of the machine to be replaced 100', which has been received in step S1, and the status information of the adjustment-target machine 100, which has been received in step S3, the server 200 creates the setting information of the adjustment-target machine 100. Then, the server 200 transmits the created setting information to the adjustment-target machine 100 (step S7). Upon reception of the setting information from the server 200 (step Q7), the adjustment-target machine 100 sets the received setting information in the machine (step Q9).

Figure 7A:
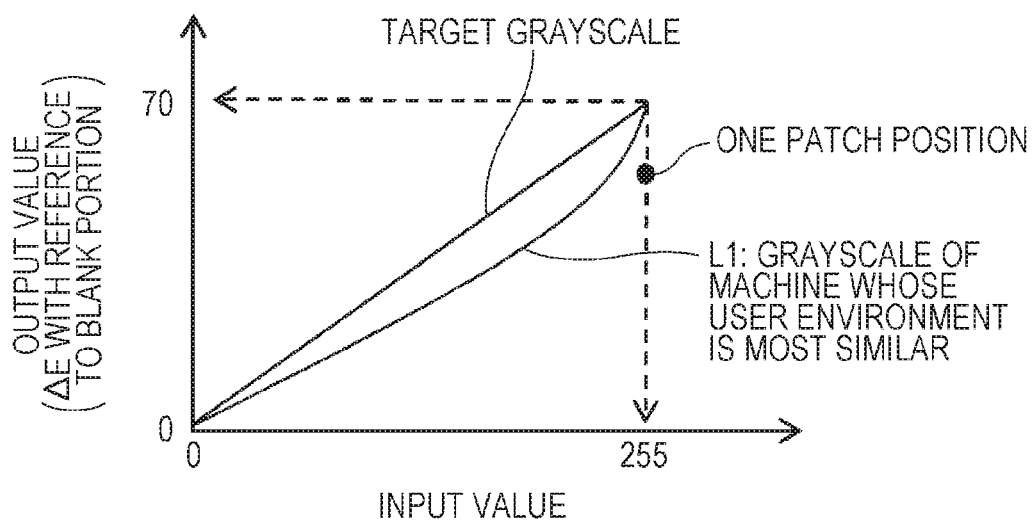
FIGS. 7A and 7B illustrate grayscales of a reference image forming apparatus and the image forming apparatus that is an adjustment target.
Figure 7B:
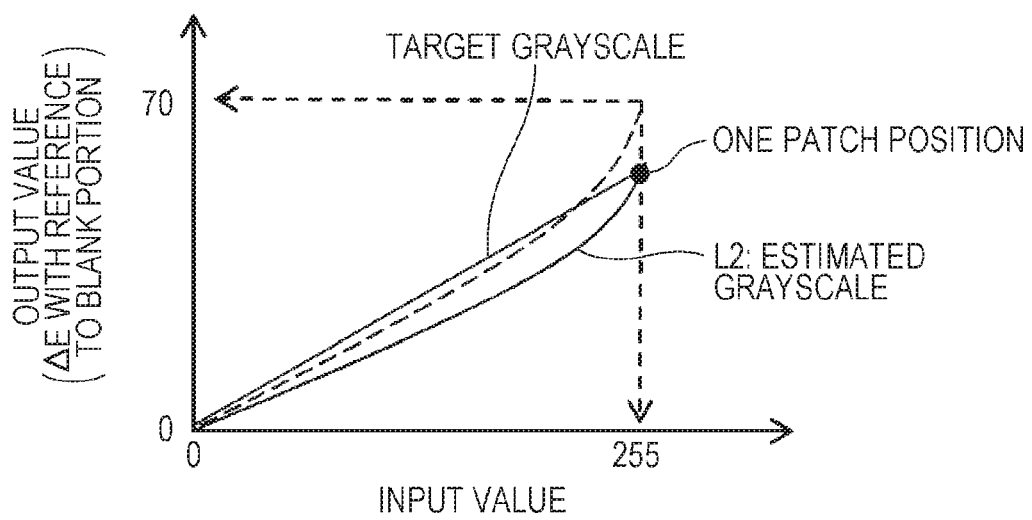

Next, FIGS. 7A and 7B illustrate a second embodiment and illustrates a case in which setting information is to be set in an adjustment-target machine. In the second embodiment, the setting information is more easily created by referring to information of a group of other machines by using the server 200 without having to perform complicated processing for adjusting the adjustment-target machine 100 in order to adjust the adjustment-target machine 100. In the example of FIGS. 7A and 7B, the adjustment-target machine 100 creates a patch at a predetermined density, for example, at the maximum input value 255, and the density sensor 131 measures the patch density. Then, the adjustment-target machine 100 transmits the measured patch density, temperature and humidity, and the number of printed sheets of paper, and the setting information as needed, to the server 200. From a group of machines that are connected through the network 300 and that include different models, the server 200 selects, as a reference machine, a machine having values of the patch density, temperature and humidity, the number of printed sheets of paper that are the closest to the values of the adjustment-target machine 100, that is, a machine that is the most similar to the adjustment-target machine 100.

In accordance with the differences in information items between the adjustment-target machine 100 and the reference machine, the server 200 corrects the grayscale (see grayscale line L1 in FIG. 7A) of the reference machine. The correction is performed by using corresponding information of both machines, and for example, the grayscale between the patch density detected in the adjustment-target machine 100 and the origin is corrected (see grayscale line L2 in FIG. 7B). In this case, the correction is performed in consideration of the magnitude of the differences in temperature and humidity and number of printed sheets of paper. Correction characteristics in each information item may be registered in advance. Thus, instead of process control performed by interrupting a printing operation, for example, the density and grayscale can be adjusted.

Figure 8:
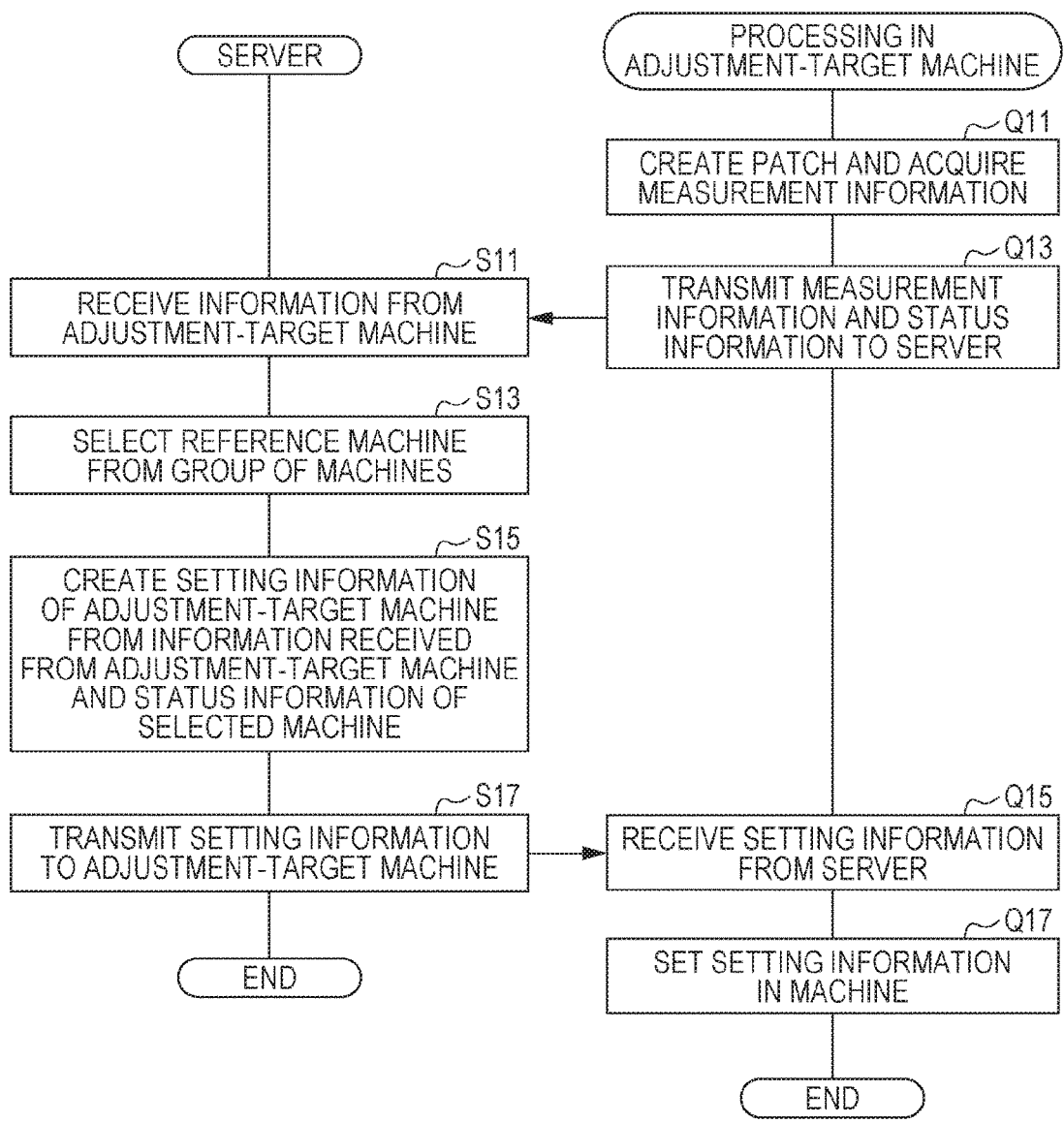
FIG. 8 is a flowchart illustrating processing according to a second embodiment for adjusting the image forming apparatus that is an adjustment target, the processing performed between the server and the image forming apparatus that is an adjustment target.

Next, setting of setting information in an adjustment-target machine will be described with reference to FIG. 8. First, the adjustment-target machine 100 creates a patch and measures the density thereof in an adjustment mode (step Q11) and then transmits information about the measurement to the server 200 together with ID information (step Q13). Upon reception of the information about the measurement and the status information together with the ID information from the adjustment-target machine 100, which is included in a group of machines (step S11), the server 200 compares the received information about the measurement and status information of the adjustment-target machine 100 with the corresponding information of each machine in the group of machines except for the adjustment-target machine 100 and may select a machine having the highest similarity as a reference machine (step S13). For example, a machine having the minimum value of the sum of differences (including weight) in information items (or selected information item) may be determined as the machine having the highest similarity.

Then, from the information received from the adjustment-target machine 100 and the status information of the selected machine, the server 200 creates the setting information of the adjustment-target machine 100 (step S15). Then, the server 200 transmits the created setting information to the adjustment-target machine 100 (step S17). Upon reception of the setting information from the server 200 (step Q15), the adjustment-target machine 100 sets the received setting information in the machine (step Q17).

Note that a third embodiment may be implemented in which the setting information of the adjustment-target machine 100 is adjusted by using a portable memory chip instead of the server 200. For example, the machine to be replaced 100' may include a detachable memory chip that performs communication with the controller 110 of the image forming apparatus 100, and the user-environment information may be transferred from the machine to be replaced 100' to the memory chip that is inserted in the machine to be replaced 100'. Then, after connecting and starting the adjustment-target machine 100 after replacement, this memory chip is inserted into the adjustment-target machine 100, and the information transferred from the machine to be replaced 100' may be transferred to the adjustment-target machine 100. In this case, the adjustment-target machine 100 creates the setting information. Alternatively, the memory chip may include a controller so as to obtain the status information of the adjustment-target machine 100 by being inserted into the adjustment-target machine 100 and to perform processing for creating the setting information in the same manner as the server 200 performs processing to transmit the setting information to the adjustment-target machine 100. Accordingly, a small apparatus and a small system as a whole may be provided.

The present disclosure contains subject matter related to that disclosed in Japanese Priority Patent Application JP 2016-116761 filed in the Japan Patent Office on Jun. 13, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus to be connected to an image forming apparatus in such a manner that communication is possible through a network, the image forming apparatus forming an image in accordance with information that is set therein, the information processing apparatus comprising:
   a controller; and
   a storage; wherein
   the controller obtains, through the network, first information having been set in a first image forming apparatus, and second information having been set in a second image forming apparatus that is an adjustment target,
   the controller stores the first information and the second information in the storage,
   the controller reads the first information and the second information from the storage, and creates third information for the second image forming apparatus based on the first information and the second information, and
   the controller transmits the third information, which is different from the first information and the second information, through the network, to the second image forming apparatus such that the third information is set in the second image forming apparatus and the second image forming apparatus forms an image in accordance with the third information by transferring obtained image data onto a recording sheet.

2. The information processing apparatus according to claim 1, wherein
   the controller creates the third information by adding new information to the second information.

3. The information processing apparatus according to claim 1, wherein
   the first information, the second information and the third information include an image forming condition.

4. The information processing apparatus according to claim 1, wherein
   the first image forming apparatus is an apparatus to be replaced, and the second image forming apparatus is an apparatus that replaces the first image forming apparatus.

5. The information processing apparatus according to claim 1, wherein
   the storage stores model information of the image forming apparatus according to a model, and
   the controller creates, based on the information stored in the storage, the third information of the second image forming apparatus in accordance with the first model information of the first image forming apparatus and the second model information of the second image forming apparatus.

6. The information processing apparatus according to claim 1, wherein
   the first image forming apparatus is selected from among image forming apparatuses other than the second image forming apparatus, as an apparatus having information with a highest similarity of the second information of the second image forming apparatus.

7. An image forming apparatus management system comprising:
   the information processing apparatus according to claim 1; and
   the first and second image forming apparatuses connected to the information processing apparatus through the network; wherein
   the controller transmits the third information to the second image forming apparatus, and
   the second image forming apparatus forms an image by the third information transmitted from the controller.

* * * * *